Patented Mar. 15, 1927.

1,620,977

UNITED STATES PATENT OFFICE.

WILLIAM G. LINDSAY, OF NEWARK, NEW JERSEY, ASSIGNOR TO THE CELLULOID COMPANY, A CORPORATION OF NEW JERSEY.

CELLULOSE COMPOSITION.

No Drawing.   Application filed June 2, 1924. Serial No. 717,219.

This invention relates to cellulose compositions and to a process of making the same. Such compositions may be varnishes, lacquers, aeroplane coatings, transparent sheets and films such as are used for photographic supports for cinematographic use and other purposes, or may be plastic masses. These compositions have as a base a soluble cellulose derivative, such as cellulose acetate, nitrate, or other cellulose ester, or a cellulose ether such as ethyl cellulose or methyl cellulose. This class of derivative is well known to be quite distinct from the cellulose "viscose."

I have discovered that the compound $\beta\beta'$ di-chlor ethyl ether, a liquid at ordinary temperatures and having a boiling point of 177 to 178° C. at ordinary pressure is a solvent of wide application in the manufacture and production of compounds and plastics as above enumerated. The solvent power of this compound in many combinations can be stimulated by the addition of aliphatic alcohols, such as ethyl alcohol, methyl alcohol, butyl alcohol, amyl alcohol and the like. The peculiar solvent action of this compound is of unusual value in the production of solutions and plastic masses from cellulose derivatives. It can also be used as a solvent for combining cellulose derivatives, such as cellulose acetate and cellulose nitrate, or cellulose acetate and cellulose ether, etc., in the same mass.

As an example of the use of this solvent for the production of a composition having a base of acetyl cellulose, the following will be readily understood by those skilled in the art to which this invention relates: For making an aeroplane dope, or a varnish, or a solution for the production of transparent sheets to be used as photographic supports, to 100 parts of acetyl cellulose, preferably of that variety which is freely soluble in acetone, I add from 500 to 800 parts by weight of a volatile solvent, such as acetone, or a chlorinated hydrocarbon-alcohol solvent as is disclosed in my U. S. Patents Nos. 1,027,614, 1,027,616, 1,027,618, 1,041,113, and to this solution of acetyl cellulose, I add from 10 to 50 parts of $\beta\beta'$ di-chlorethyl ether and from 5 to 20 parts of an aliphatic alcohol having more than two carbon atoms, such as normal butyl alcohol, amyl alcohol, etc. The solution thus produced will be useful as a varnish or coating for aeroplane wings, or it can be used for making transparent sheets for photo film supports by spreading on a suitable surface, evaporating and stripping the resultant dried composition from the support according to the method well known to those skilled in the art of making motion picture film supports.

The product thus produced will possess great toughness, flexibility, durability and will maintain these properties for a great length of time.

The $\beta\beta'$ di-chlorethyl ether can be used without the addition of the higher aliphatic alcohols and with or without alcohols of the aromatic series or equivalent high boiling compounds, such as ethyl benzoate, benzyl acetate and the like. Or the higher boiling aliphatic esters may be used, such as amyl acetate, the proportions varying from 5 to 20 parts or more to 100 parts of the soluble cellulose derivative.

$\beta\beta'$ di-chlorethyl ether can also be used in combination with well known plasticizers, tri-phenylphosphate, tri-cresylphosphate, camphor, manol (ethyl acetanilid), toluol-paraethylsulphonamid and the like, without, of course, departing from this invention, as it will be found in every case that the $\beta\beta'$ di-chlorethyl ether imparts very valuable properties to the finished product, such as increased toughness, durability, flexibility, etc.

As an example of a plastic composition, I incorporate with 100 parts acetyl cellulose, 20 to 50 parts or more of $\beta\beta'$ di-chlorethyl ether and from 10 to 50 parts of an aliphatic alcohol having more than two carbon atoms and a sufficient quantity of a chlorinated hydrocarbon alcohol solvent as disclosed in my patents above referred to; or I may use ethyl acetate, acetone, or an equivalent solvent, the proportions of which may vary from 50 to 80 parts or more; or I may use ethyl or methyl alcohol, or a combination of these two alcohols, depending upon their stimulating action for bringing about the necessary plasticity of the acetyl cellulose mixture without the employment of an additional solvent. I may also add proportions of from 5 to 20 parts or more of any one of the well known plasticizers, such as triphenylphosphate, tricresylphosphate, camphor, or the like and I may add small proportions of aromatic esters such as benzyl acetate or aliphatic esters such as amyl acetate, but in general, very satisfactory results are obtained by plasticizing the acetyl cellulose with a mixture of $\beta\beta'$ di-chlorethyl ether and ethyl or methyl alcohol. The plasticity and toughness of sheets of plastic or similar compositions will be increased by the use of $\beta\beta'$ di-chlorethyl ether where cellulose ethers are used instead of cellulose acetate.

As an example of a nitrocellulose composition, I incorporate with 100 parts of nitrocellulose from 10 to 50 or more parts of $\beta\beta'$ di-chlorethyl ether and to this mixture, I may add from 25 to 50 parts or more of ethyl or methyl alcohol with or without the addition of further stimulating volatile solvents. The $\beta\beta'$ di-chlorethyl ether can be used in the production of nitrocellulose varnish solutions for making photographic films and in fact, a wide variety of nitrocellulose compositions in which camphor is ordinarily used and it can be employed with or without the addition of the well known plasticizing compounds triphenylphosphate, tricresylphosphate, camphor, di-ethyl phthallate, butyl tartrate, manol, toluolparaethylsulphonamid and the like. It may also be used for the purpose of incorporating gums, resins and the like, such for example as ester gum, gum dammar, with solutions of cellulose derivatives. It may also be used as a varnish solvent.

It may also be used in non-inflammable cellulose compositions, such as those disclosed in my Patents Nos. 1,493,207, 1,493,208, 1,493,209 and 1,493,210.

I claim:

1. A composition containing $\beta\beta'$ di-chlorethyl ether and a cellulose derivative of the ether-ester class with which said ether has a solvent action.

2. A composition containing a soluble cellulose ester and $\beta\beta'$ di-chlorethyl ether.

3. A composition containing $\beta\beta'$ di-chlorethyl ether, alcohol and a cellulose derivative of the ether-ester class with which said ether has a solvent action.

4. A composition containing $\beta\beta'$ di-chlorethyl ether and a mixture of cellulose derivatives of the ether-ester class with which said ether has a solvent action.

5. A composition containing a soluble cellulose derivative of the ether-ester class, $\beta\beta'$ di-chlorethyl ether and an aliphatic alcohol solvent of the mixture of the derivative and ether.

6. A composition containing a soluble cellulose ester, $\beta\beta'$ di-chlorethyl ether, a high boiling aliphatic alcohol, a high boiling pyroxylin solvent and a volatile solvent of the mixture of the before mentioned ingredients.

WILLIAM G. LINDSAY.